US008463234B2

(12) United States Patent
Lee et al.

(10) Patent No.: US 8,463,234 B2
(45) Date of Patent: Jun. 11, 2013

(54) METHOD FOR PROVIDING SECURITY SERVICES BY USING MOBILE TERMINAL PASSWORD AND MOBILE TERMINAL THEREOF

(75) Inventors: Sang-Youl Lee, Gyeonggi-do (KR); Min Kim, Gyeonggi-do (KR); Ho-Jung Choun, Seoul (KR)

(73) Assignee: KT Corporation, Seongnam (KR)

( * ) Notice: Subject to any disclaimer, the term of this patent is extended or adjusted under 35 U.S.C. 154(b) by 708 days.

(21) Appl. No.: 12/373,060

(22) PCT Filed: Jul. 16, 2007

(86) PCT No.: PCT/KR2007/003449
§ 371 (c)(1),
(2), (4) Date: Jan. 9, 2009

(87) PCT Pub. No.: WO2008/010661
PCT Pub. Date: Jan. 24, 2008

(65) Prior Publication Data
US 2009/0247123 A1 Oct. 1, 2009

(30) Foreign Application Priority Data

Jul. 18, 2006 (KR) .................. 10-2006-0066862
Jul. 18, 2006 (KR) .................. 10-2006-0066863
Aug. 21, 2006 (KR) .................. 10-2006-0078787

(51) Int. Cl.
*H04M 1/66* (2006.01)
(52) U.S. Cl.
USPC ............... 455/410; 379/37; 379/45; 705/41; 705/42; 705/43; 705/44
(58) Field of Classification Search
USPC ......................................... 455/410
See application file for complete search history.

(56) References Cited

U.S. PATENT DOCUMENTS 4,675,815 A * 6/1987 Kuroki et al. ................. 379/37
5,731,575 A * 3/1998 Zingher et al. .............. 235/379

(Continued)

FOREIGN PATENT DOCUMENTS

| EP | 0601659 A1 | 6/1994 |
| EP | 1592194 A1 | 11/2005 |

(Continued)

OTHER PUBLICATIONS

The International Search Report for PCT Application No. PCT/KR2007/003449; Filed Jul. 16, 2007; Date of Completion Oct. 30, 2008; Date of Mailing Nov. 11, 2008.

(Continued)

*Primary Examiner* — Kiet Doan
*Assistant Examiner* — Mazda Sabouri
(74) *Attorney, Agent, or Firm* — Sughrue Mion, PLLC

(57) ABSTRACT

A security service providing method using a mobile terminal password and a mobile terminal thereof. A normal password and an emergency password are stored in a smart card in advance. When a password for using a special service is input by a mobile terminal user, the input password is compared with the normal password and the emergency password. When the input password corresponds to the normal password, a special service requested by the user is provided. When the input password corresponds to the emergency password, a predetermined emergency process is performed. According to the emergency process, an emergency message is transmitted to the outside through a predetermined emergency networking process, predetermined virtual process information is displayed, or an abnormal process message for indicating unavailability of provision of the requested special service is displayed to the mobile terminal. Therefore, security is guaranteed and reliability is provided to the user who uses a special service through a mobile terminal by providing an emergency process performance function to the limited function of the password used for identification and authentication.

10 Claims, 13 Drawing Sheets

U.S. PATENT DOCUMENTS

| | | | |
|---|---|---|---|
| 6,397,054 B1 * | 5/2002 | Hoirup et al. | 455/404.1 |
| 6,583,714 B1 * | 6/2003 | Gabou et al. | 340/5.54 |
| 7,433,672 B2 | 10/2008 | Wood | |
| 7,533,047 B2 * | 5/2009 | Hagale et al. | 705/35 |
| 2002/0112183 A1 | 8/2002 | Baird, III et al. | |
| 2003/0141372 A1 * | 7/2003 | Brown et al. | 235/487 |
| 2003/0141977 A1 | 7/2003 | Brown et al. | |
| 2003/0144952 A1 | 7/2003 | Brown et al. | |
| 2004/0267664 A1 * | 12/2004 | Nam et al. | 705/41 |
| 2005/0065885 A1 * | 3/2005 | Gordon | 705/43 |
| 2006/0084463 A1 * | 4/2006 | Yoo et al. | 455/550.1 |
| 2006/0222151 A1 * | 10/2006 | Goldman et al. | 379/45 |
| 2006/0287012 A1 * | 12/2006 | Lan | 455/575.1 |
| 2008/0257967 A1 * | 10/2008 | Nishizawa et al. | 235/492 |

FOREIGN PATENT DOCUMENTS

| | | |
|---|---|---|
| JP | 62-043773 | 2/1987 |
| JP | 10-063742 A | 3/1998 |
| JP | 2000-276531 | 10/2000 |
| JP | 2002-358418 | 12/2002 |
| JP | 2005-123882 | 5/2005 |
| JP | 2005-196800 | 7/2005 |
| JP | 2005-525632 | 8/2005 |
| KR | 10-2003-094930 A | 12/2003 |
| KR | 10-2004-0006126 A | 1/2004 |
| KR | 10-2004-0026034 A | 3/2004 |
| KR | 10-2004-0037678 A | 5/2004 |
| KR | 10-2004-0096349 A | 11/2004 |
| KR | 10-2005-0121358 A | 12/2005 |
| KR | 10-2006-0080171 A | 7/2006 |

OTHER PUBLICATIONS

The Written Opinion for PCT Application No. PCT/KR2007/003449; Filed Jul. 16, 2007; Date of Completion Oct. 30, 2008; Date of Mailing Nov. 11, 2008.

Supplementary European Search Report Appln. No. EP07768778; Nov. 16, 2011.

* cited by examiner

Fig. 2

| PIN #1 | PIN #2 | Emergency Telephone Number | Emergency Message |
|---|---|---|---|
| #### | **** | ΔΔΔ - ΔΔΔ - ΔΔΔΔ | OOO - OOO - OOOO |

# METHOD FOR PROVIDING SECURITY SERVICES BY USING MOBILE TERMINAL PASSWORD AND MOBILE TERMINAL THEREOF

TECHNICAL FIELD

The present invention relates to a security service of a mobile terminal. More particularly, the present invention relates to a method for providing a security service for a mobile terminal having a special service function using a password to process emergency states, and a mobile terminal thereof.

BACKGROUND ART

As the engineering of electronics and communication has been greatly developed, mobile terminals have used various types of functions. That is, as radio communication and data processing techniques have been very quickly developed, functions such as Internet access, video communication, and moving picture message transmission in addition to voice calling have become available to users using the mobile terminal. Also, as mobile terminals have become greatly widespread, a large amount of communication generated among people has been performed through the mobile terminals, and hence, the mobile terminals have become essential communication tools for contemporary life.

Together with the above-noted trend, various services such as usage of contents and financial transaction services through a mobile terminal have been provided and the usage fields have been increased. In this instance, in order to provide the usage of contents and a financial transaction service through a mobile terminal, a settling system guaranteeing security must be provided, and for this purpose, other security methods for user authentication such as a smart card or banking chip have been provided in various ways.

The conventional authentication and security methods have provided security systems generated by combining authentication that uses a smart card or banking chip installed in the mobile terminal and authentication using a password. That is, conventionally, an additional authentication server authenticates whether the smart card or banking chip installed in the mobile terminal is normal and determines an input password to thus maintain security.

However, when a subscriber having the mobile terminal is threatened or kidnapped by a thief to thus fall into an irresistible condition, the above-noted conventional security system cannot guarantee the subscriber's security. That is, the prior art has no means for solving the case in which the subscriber is forced to settle financial information or transfer money by using a mobile terminal in a coercive condition, or he is forced to call someone to pay a ransom while he is abducted.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a security service providing method for conveying an emergency of a subscriber having a mobile terminal to the outside, and a mobile terminal thereof.

The present invention has been made in another effort to provide a security service providing method for conveying an emergency to the outside while displaying no conveying condition on the mobile terminal, and a mobile terminal thereof.

The present invention has been made in another effort to provide a security service providing method for displaying virtual process information on a special service in the case of an emergency of a subscriber having a mobile terminal, and a mobile terminal thereof.

The present invention has been made in another effort to provide a security service providing method for displaying an abnormal process message that notifies unavailability of a special service that is requested in the case of an emergency of the subscriber having a mobile terminal, and a mobile terminal.

Technical Solution

In one aspect of the present invention, a method for providing a security service by a mobile terminal having a special service function that is processed by using a password includes: a) receiving a password for activating the special service function; b) comparing the password with a normal password and an emergency password that are set and stored in a memory; and c) activating the special service function when the password corresponds to the normal password, and performing a predetermined emergency networking process and activating the special service function when the password corresponds to the emergency password.

The special service function is a financial transaction function or a communication function.

The memory includes a universal IC card (UICC) or a universal subscriber identity module (USIM).

In another aspect of the present invention, a mobile terminal having a special service function that is processed by using a password includes: a password input module for receiving a password from a user; a storage module for storing a predetermined normal password and an emergency password, and at least one emergency telephone number and one emergency message; an authentication module for providing an authentication success signal when the password provided by the password input module corresponds to the normal password stored in the storage module, and instructing an emergency process together with the authentication success signal when the password corresponds to the emergency password; a message transmission module for transmitting the emergency message stored in the storage module to at least one emergency telephone number stored in the storage module when an emergency process is instructed by the authentication module; and a function activation module for receiving an authentication success signal from the authentication module and activating the special service function.

In another aspect of the present invention, a method for providing a security service by a mobile terminal having a special service function processed by using a password includes: a) receiving a password for using the special service function; b) extracting an emergency password stored in a memory; and c) comparing the password and the emergency password, and when they correspond to each other, generating virtual process information on the special service function, or extracting predetermined virtual process information and displaying the same to the mobile terminal.

In another aspect of the present invention, a mobile terminal having a special service function processed by using a password includes: a key input unit for receiving external inputs including a password for using the special service function; a memory for storing a normal password for providing a normal special service and an emergency password for providing virtual process information for the special service; a display for displaying a password authentication screen, a normal process information screen, and a virtual process information screen for providing the special service in addition to the operation state of the mobile terminal; and a controller for respectively comparing the password provided through the key input unit and the normal password and the emergency password stored in the memory, and generating and providing virtual process information or providing a normal special service according to the comparison result.

In another aspect of the present invention, a method for providing a security service by a mobile terminal having a special service function processed by using a password includes: a) receiving a password for using the special service function; b) extracting an emergency password stored in a memory; and c) comparing the input password and the emergency password, and when they correspond to each other, generating an abnormal process message for indicating unavailability of usage of the special service function, or extracting a predetermined abnormal process message and displaying the message to the mobile terminal.

In another aspect of the present invention, a mobile terminal having a special service function processed by using a password includes: a key input unit for receiving external inputs including a password for using the special service function; a memory for storing a normal password for providing a normal special service and an emergency password for providing an abnormal process message for indicating unavailability of usage of the special service function; a display for displaying a password authentication screen, a normal process information screen, and the abnormal process message for providing the special service in addition to the operation state of the mobile terminal; and a controller for respectively comparing the password provided through the key input unit and the normal password and the emergency password stored in the memory, and generating and providing the abnormal process message or providing the normal special service according to the comparison result.

Advantageous Effects

According to the present invention, the safety of the user who uses the special service that is processed by using a password through a mobile terminal is guaranteed and the reliability is given to him by providing an emergency notifying function to the limited function of the PIN used for identification and authentication.

Also, when an emergency occurs, the user's safety is guaranteed by providing the same virtual screen as that of performing a normal process, and the monetary loss caused by normal processing can be reduced in the case of processing the special service that is processed by using a password, and hence, safety and reliability can be provided to the user who uses the special service by using a mobile terminal.

Further, when an emergency occurs, information leakage caused by using a special service can be prevented by generating and providing an abnormal process message for indicating no execution of the normal process, property loss can be reduced by preventing the normal process, and safety and reliability can be provided to the user who uses the special service by using a mobile terminal.

In addition, a security system for easily processing the emergency without any complicated systems such as an additional authentication server or an emergency processing server, can be provided.

BRIEF DESCRIPTION OF THE DRAWINGS

FIG. 2 shows a table for information stored in a storage module of FIG. 1.

BEST MODE FOR CARRYING OUT THE INVENTION

Figure 1:
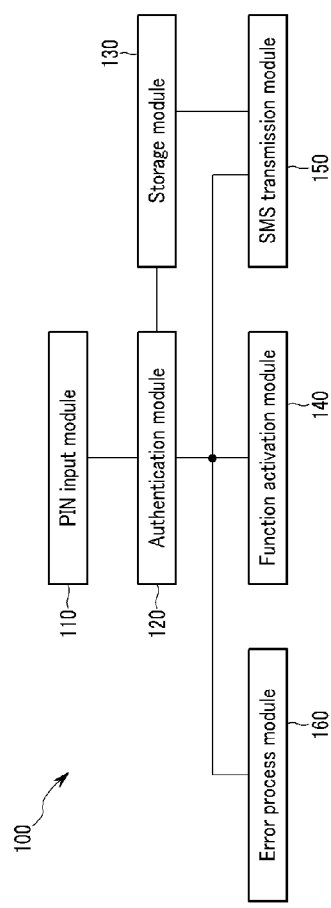
FIG. 1 shows a configuration diagram of a device for providing a security service through a mobile terminal password according to a first exemplary embodiment of the present invention.

The present invention will be described more fully hereinafter with reference to the accompanying drawings, in which exemplary embodiments of the invention are shown. However, the present invention can be realized in various different forms and is not restricted to the current exemplary embodiments. Accordingly, the drawings and description are to be regarded as illustrative in nature and not restrictive. Like reference numerals designate like elements throughout the specification.

Also, throughout this specification and the claims that follow, unless explicitly described to the contrary, the word "comprising" and variations such as "comprises" will be understood to imply the inclusion of stated elements but not the exclusion of any other elements.

FIG. 1 shows a configuration diagram of a device for providing a security service through a mobile terminal password according to a first exemplary embodiment of the present invention.

As shown in FIG. 1, the security service providing device 100 is installed in the mobile terminal and provides a user authentication and user security service. The security service providing device 100 includes a personal identification number (PIN) input module 110, an authentication module 120, a storage module 130, a function activation module 140, a short message service (SMS) transmission module 150, and an error process module 160.

The PIN input module 110 receives a PIN that is a password for authenticating usage of a financial transaction function of a mobile terminal from a user who uses the mobile terminal. The PIN input module 110 receives a PIN from the user through an input device of the mobile terminal or a key pad. The PIN does not identify the user through a telephone cable in a like manner of a telephone number or a number of a telephone but it is used for a system that identifies the user by using a magnetic card, an IC card, or a smart card.

The storage module 130 is a memory for storing information used for user authentication. The storage module 130 stores information on the emergency. The storage module 130 stores a PIN for identifying the user through a PIN authentication process, and the PIN is predetermined and stored by a registered mobile terminal owner or subscriber, or the same is issued and stored after the user is determined to be a registered owner or subscriber. The storage module 130 is desirably controlled for write and read functions and is protected from forgery and corruption. A universal IC card (UICC) and a universal subscriber identity module (USIM) can be used for the storage module 130. The UICC and the USIM have a security-reinforced memory chip, and store the PIN in the security region.

Particularly, a PIN storage region of the storage module 130 stores two types of PINs that include a normal PIN used for authenticating normal users and an emergency PIN for processing emergencies. FIG. 2 shows a table for information stored in a storage module 130. Referring to FIG. 2, a PIN #1 and a PIN #2 are respectively stored, and an emergency telephone number and emergency message data are additionally stored as emergency information. Here, the PIN #1 is a normal PIN, and the PIN #2 is an emergency PIN. Also, the telephone number or address information selected from a telephone directory of a mobile terminal can be stored as the emergency telephone number. For example, assuming that the number 5 is assigned a home telephone number in the telephone directory of a mobile terminal and the number 47 is assigned a telephone number of a police station, at least one telephone number can be expressed by storing the numbers 5 and 47 in the emergency telephone number region of the storage module 130. Also, regarding the emergency message data, an emergency indicating message or an emergency deliverance request message is stored in an SMS transmittable format, and a phrase predefined by the user or a general emergency phrase is stored.

The authentication module 120 performs the authentication process by using the PIN input by the PIN input module 110. The authentication module 120 compares the input PIN and the two PINs stored in the storage module 130. When the input PIN number corresponds to PIN #1, it is determined as an authentication success and an authentication success signal is provided. When the input PIN number corresponds to PIN #2, it is determined as an emergency, an emergency process is ordered, and an authentication success signal is provided.

Finally, when the input PIN number does not correspond to either of the two PINs PIN #1 and PIN #2, it is determined as an input error, the user is determined as not being a registered user, and an authentication failure signal is provided.

The function activation module 140 activates a financial transaction function of the mobile terminal and allows the user to progress to the next process when the signal provided by the authentication module 120 is an authentication success signal, and it restricts usage of the financial transaction function of the mobile terminal when the signal provided by the authentication module 120 is an authentication failure signal.

The SMS transmission module 150 performs the emergency process instructed by the authentication module 120. On receiving the emergency process instruction from the authentication module 120, the SMS transmission module 150 reads the emergency telephone number and the emergency message data stored in the storage module 130 and transmits an SMS. When the storage module 130 stores a plurality of telephone numbers, the SMS transmission module 150 transmits the SMS to each of the telephone numbers. Particularly, the emergency process performed by the SMS transmission module 150 is performed in a background mode in the mobile terminal, and no progress process or transmission results are displayed.

The error process module 160 receives the authentication failure signal from the authentication module 120 and outputs an error message to the mobile terminal.

Accordingly, the security service providing device 100 according to the first exemplary embodiment of the present invention is installed in the mobile terminal. The mobile terminal performs a special service processed by using a password, for example, a function that requires a user authentication process in the case of a financial transaction. In this instance, the registered subscriber who is the owner of the mobile terminal predetermines two passwords that are used for authentication so that he can process an emergency separately from a normal authentication process. That is, when attempting to use the financial transaction function of the mobile terminal in a general condition, a normal PIN is input to perform a user authentication process, and the financial transaction function is then used after it is activated. However, when the user is forcibly urged to use the financial transaction function of the mobile terminal because of threats or abduction by a robber, and when the user inputs the emergency PIN or he is instructed to input the same, the authentication is normally performed to activate the financial transaction function and an emergency indicating message or an emergency deliverance request message is concurrently transmitted to a predetermined emergency telephone number. Therefore, the emergency can be notified to family or the police without the abnormal user such as a robber knowing it.

A security service providing method through a mobile terminal password according to a first exemplary embodiment of the present invention will now be described referring to FIG. 3 and FIG. 4.

Figure 3:
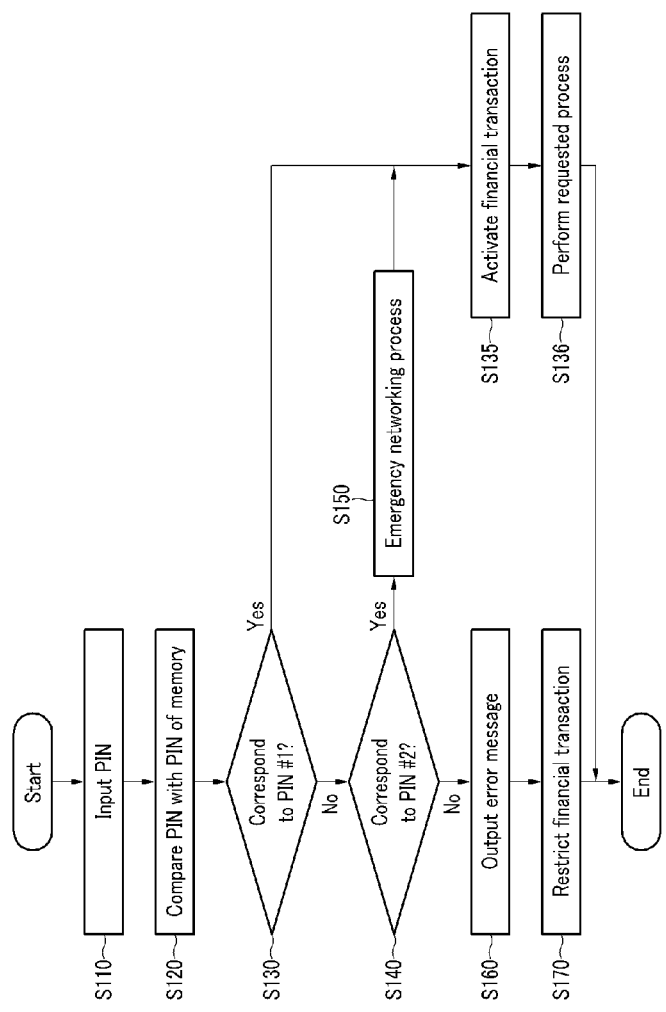
FIG. 3 shows a flowchart for a security service providing method according to a first exemplary embodiment of the present invention.

FIG. 3 shows a flowchart for a security service providing method according to a first exemplary embodiment of the present invention.

As shown in FIG. 3, the PIN input module 110 of the security service providing device 100 receives a PIN for user authentication from the user who desires to use a financial transaction function of the mobile terminal (S110).

On receiving the PIN from the PIN input module 110, the authentication module 120 reads the two PINs PIN #1 and PIN #2 from the storage module 130 and compares whether the two PINs correspond to the PIN input by the PIN input module 110. In this instance, the PINs stored in the storage module 130 include a normal PIN PIN #1 and an emergency PIN PIN #2 that are stored in advance or are registered to the UICC or the USIM in advance by the subscriber who is a mobile terminal owner (S120).

The authentication module 120 determines whether the input PIN corresponds to the normal PIN PIN #1 according to the comparison result of the step of S120 (S130).

When the input PIN number corresponds to the normal PIN PIN #1, the user is authenticated to be a registered user and his financial transaction function is activated by the function activation module 140 (S135). After the financial transaction function of the mobile terminal is activated, the corresponding financial transaction function process is performed according to the user's request (S136).

When the input PIN number does not correspond to the normal PIN PIN #1, the authentication module 120 determines whether the input PIN corresponds to the emergency PIN PIN #2 (S140).

When the input PIN corresponds to the emergency PIN PIN #2, the authentication module 110 determines it as an emergency and instructs an emergency process, and the SMS transmission module 150 performs a predetermined emergency networking process (S150).

Figure 4:
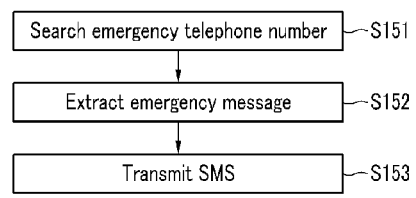
FIG. 4 shows a flowchart for an emergency networking process preparing for an emergency condition.

FIG. 4 shows a flowchart for an emergency networking process preparing for an emergency condition. Referring to FIG. 4, the SMS transmission module 150 searches for an emergency telephone number stored in the storage module 130. There can be a plurality of searched telephone numbers (S151).

The SMS transmission module 150 extracts an emergency message stored in advance in the storage module 130. The emergency message is an emergency indicating message or an emergency deliverance request message and it is stored in SMS format (S152). The SMS transmission module 150 sets the emergency telephone number searched in step S151 as a receiving number and transmits the extracted emergency message data as an SMS (S153). In this instance, the SMS transmission module 150 can extract the current location information of the mobile terminal SMS and transmit the same when transmitting the SMS. Particularly, the emergency networking process is performed in the background mode by the mobile terminal, and the performance status and result are not displayed.

The function activation module 140 authenticates the user as a registered user as the process of step S150 is performed, and it then performs steps S135 and S136.

However, when the input PIN of step S140 does not correspond to the emergency PIN PIN #2, the authentication module 120 determines that the user authentication process fails, and outputs an authentication failure signal to the error process module 160. The error process module 160 outputs an error message to the mobile terminal. When the user authentication process fails as described above, the financial transaction function is restricted by the function activation module 140 (S170). Step S110 can be performed again when the error message is output. Also, the repetition number of step S110 can be limited in consideration of a PIN input error caused by an input error or mistyping.

The first exemplary embodiment of the present invention has described the financial transaction function, but without being restricted to this, the scope of the present invention is applicable to a special service that is processed by using a password, for example, a communication function and a general mobile terminal function as well as the financial transaction when the configuration and the method of the above-noted description is applied, which is well known to a person of an ordinary skill in the art. In this case, when a user in an emergency condition requests to use the special service, it is possible to detect the emergency through the input emergency PIN and to perform a normal process on the special service and simultaneously perform the predetermined emergency networking process, thereby guaranteeing the user's safety.

As described above, the first exemplary embodiment of the present invention has described the case of notifying to the outside the generation of an emergency when the emergency is generated to the mobile terminal user, and a second exemplary embodiment of the present invention for providing virtual account information to the mobile terminal to display a virtual screen as if a normal financial transaction has been performed, thereby guaranteeing the security of the user who faces an emergency, will now be described.

It will be assumed that the virtual account information according to the second exemplary embodiment of the present invention includes transaction information that is processed by the user by using the virtual account information.

Figure 5:
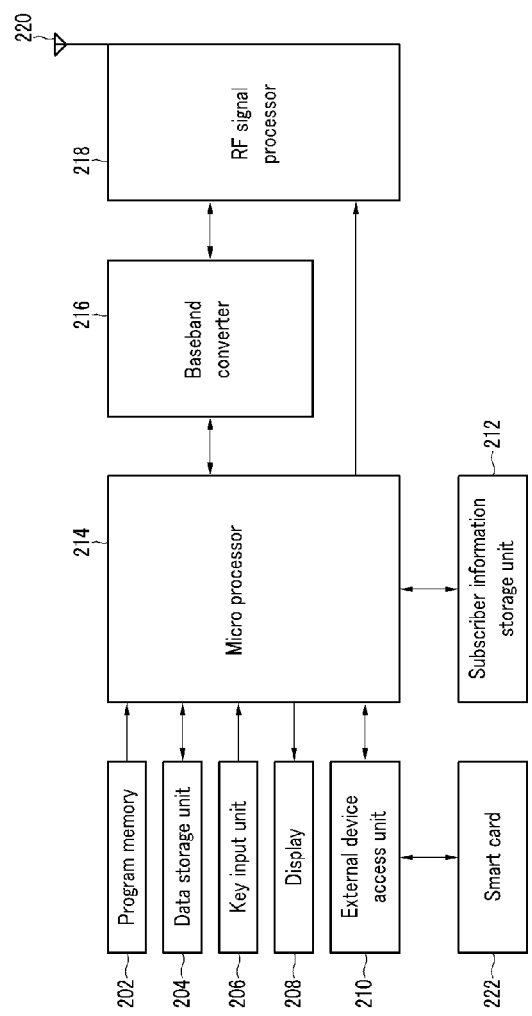
FIG. 5 shows a brief block diagram for a device for providing a security service through a mobile terminal password according to a second exemplary embodiment of the present invention.

FIG. 5 shows a brief block diagram for a device for providing a security service through a mobile terminal password according to the second exemplary embodiment of the present invention.

As shown in FIG. 5, the mobile terminal 200 according to the second exemplary embodiment of the present invention includes a program memory 202, a data storage unit 204, a key input unit 206, a display 208, an external device access unit 210, a smart card 222, a subscriber information storage unit 212, a micro processor 214, a baseband converter 216, an RF signal processor 218, and an antenna 220.

The program memory 202 stores control programs for generally controlling the mobile terminal 200, including a wired/wireless communication execution program, an additional service execution program for taking photos or moving pictures and performing a game, and a program for interworking with an external device connected through the external device access unit 210.

Also, the program memory 202 stores an input PIN checking program for calling a normal PIN and an emergency PIN that are stored in the smart card 222 connected through the external device access unit 210 and comparing the PINs with the PIN number that is input through the key input unit 206, an authentication management server connection program for interworking with the authentication management server through the mobile communication network so as to receive a financial service when the input PIN number corresponds to the normal PIN, and a virtual account generation program for generating virtual account information and displaying the same when the input PIN number corresponds to the emergency PIN.

The data storage unit 204 functions as a data buffer in the case of executing various programs, and temporarily stores the PIN number input by the key input unit 206 or the external data.

The key input unit 206 includes number keys for inputting a telephone number and a PIN number, key buttons for inputting characters, and a menu selection button.

The display 208 displays the operation status of the mobile terminal including a power usage state, a received strength of radio waves, a date, and a time, and displays financial service screens including an authentication screen, an account information screen provided by the financial service server according to an authentication process, and a predetermined virtual account information screen in the case of receiving a financial service through the mobile terminal.

The external device access unit 210 connects external devices that are connected to or inserted into the mobile terminal 200 such as a camera, a earphone jack, a charger, a data cable, and a smart card 222 to the micro processor 214.

The smart card 222 stores a normal PIN for receiving a normal financial service and an emergency PIN for displaying virtual account information. The configuration and function of the smart card 222 will be described in detail with reference to FIG. 7.

The subscriber information storage unit 212 stores subscriber registration information. The subscriber registration information includes a proper number assigned to each mobile terminal in the mobile communication network, and is inserted as a card type into the mobile terminal 200 or is stored as a chip type therein. In this instance, when the subscriber information storage unit 212 is realized as a subscriber identity module (SIM) card type, it can be realized as part of the smart card 222 storing the normal PIN and the emergency PIN.

The micro processor 214 performs voice and data calling through the mobile communication network, and receives a PIN number to check whether it is a normal PIN or an emergency PIN when receiving a financial service providing request through the key input unit 206, accesses the financial service server through the mobile communication network and the authentication management server by using the RF signal processor 218 and receives a financial service when it is a normal PIN, and generates virtual account information and transmits the same to the display 208 when it is an emergency PIN, thereby performing a total control operation. The detailed configuration of the micro processor 214 will be described with reference to FIG. 6.

The baseband converter 216 converts the signals transmitted/received through the RF signal processor 218 into baseband signals, and performs digital-analog conversion and analog-digital conversion.

Also, the baseband converter 216 transmits the financial service request signal, of which the normal PIN checking is finished and which is transmitted from the micro processor 214 to the RF signal processor 218, controls power of the RF signal processor 218 or automatically controls the gain, and receives the financial service data from the RF signal processor 218.

The RF signal processor 218 demodulates and amplifies the RF signal received from the mobile communication network through the antenna 220, and modulates and outputs the financial service request signal applied by the baseband converter 216, and the antenna 220 transmits/receives signals to/from the mobile communication network 130.

Figure 6:
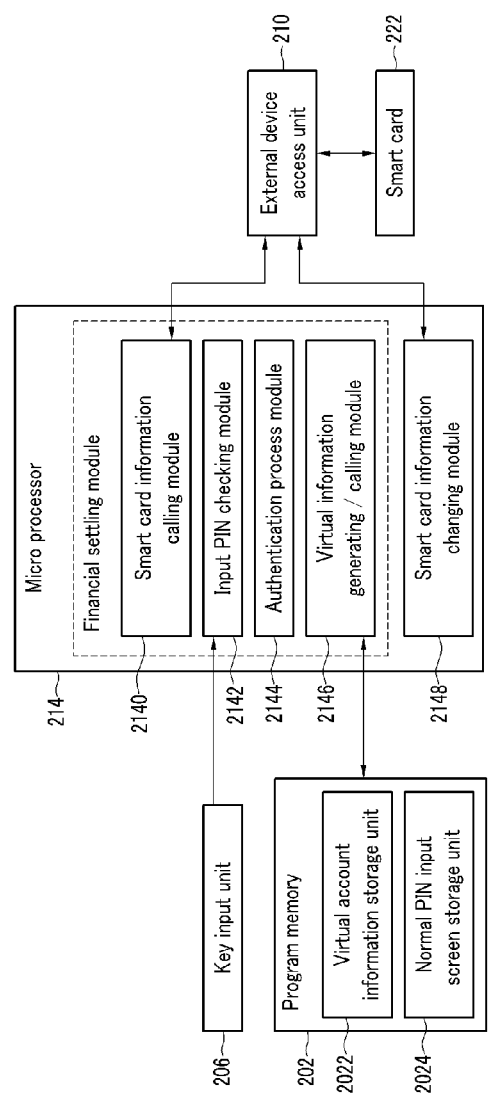
FIG. 6 shows a block diagram for a micro processor of FIG. 5.

FIG. 6 shows a block diagram for a micro processor of FIG. 5.

As shown in FIG. 6, the micro processor 214 includes a smart card information calling module 2140, an input PIN checking module 2142, an authentication process module 2144, a virtual information generating/calling module 2146, and a smart card information changing module 2148.

On receiving a financial service providing request through the key input unit 206, the smart card information calling module 2140 calls the data stored in the smart card 222 through the external device access unit 210. That is, in order to check whether the PIN number that is input according to the second exemplary embodiment of the present invention is a normal PIN for a financial service or an emergency PIN for generating virtual account information, the smart card information calling module 2140 calls the normal PIN and the emergency PIN stored in the smart card 222.

The input PIN checking module 2142 receives the PIN number (hereinafter, an input PIN) that is input by the user through the key input unit 206.

The authentication process module 2144 checks whether the input PIN is a normal PIN, an emergency PIN, or a wrongly input PIN, and authenticates the input PIN. For this purpose, the authentication process module 2144 receives an input PIN from the input PIN checking module 2142, receives a normal PIN and an emergency PIN from the smart card information calling module 2140, compares them, and checks whether the input PIN is a normal PIN or an emergency PIN.

The virtual information generating/calling module 2146 generates virtual account information when the authentication process module 2144 checks that the input PIN is an emergency PIN, or it calls the virtual account information that is generated in advance.

In this instance, when the virtual account information to be provided according to the emergency PIN input is stored in advance in the program memory 202 or the data storage unit 204, the virtual information generating/calling module 2146 calls the predetermined virtual account information and displays the same to the display 208, and when the micro processor 214 is set to generate the virtual account information, the virtual information generating/calling module 2146 calls a virtual account generation program from the program memory 202 to generate the virtual account information, and displays the virtual account information to the display 208.

The program memory 202 includes a virtual account information storage unit 2022 and a normal PIN input screen storage unit 2024 so as to store the virtual account information in advance. The virtual account information storage unit 2022 and the normal PIN input screen storage unit 2024 can be included in the data storage unit 204, rather than the program memory 202.

Here, the virtual account information storage unit 2022 stores virtual account information and a virtual account screen to be provided to the virtual information generating/calling module 2146 according to the input of an emergency PIN.

The normal PIN input screen storage unit 2024 stores a normal PIN input screen for displaying a screen that is displayed when a normal PIN is input to access the financial service server even though the emergency PIN is actually input and the mobile terminal 200 does not access the authentication management server and the financial service server, in order to guarantee the security of the mobile terminal user.

The smart card information changing module 2148 changes the history stored in the smart card 222, that is, it changes the normal PIN and the emergency PIN stored therein.

Figure 7:
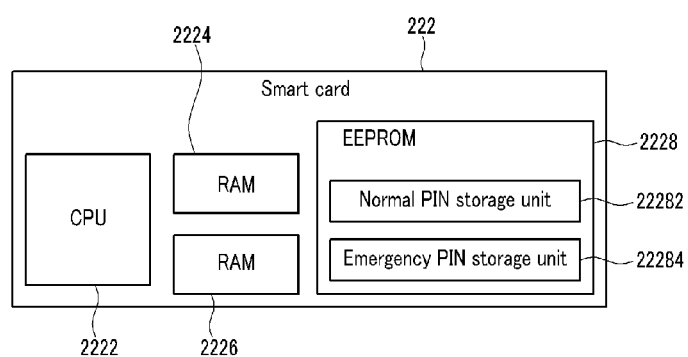
FIG. 7 shows a block diagram for a smart card of FIG. 5.

FIG. 7 shows a block diagram for a smart card of FIG. 5.

As shown in FIG. 7, the smart card 222 includes a central processing unit (CPU) 2222, a read only memory (ROM) 2224, a random access memory (RAM) 2226, and an electrically erasable and programmable ROM (EEPROM) 2228.

The CPU 2222 stores data in the ROM 2224, the RAM 2226, and the EEPROM 2228 of the smart card 222, and calls or modifies the stored data to thus control the entire data input/output of the smart card 222.

The ROM 2224 stores the data that cannot be modified, and installs the operating system and the security algorithm of the smart card 222. Generally, the chip operating system (COS) is used as the operating system for the smart card 222.

The RAM 222 stores temporary data, and in detail, it stores data while power is supplied to the smart card 222, and the data are lost when the power is no longer supplied to the RAM 222.

The EEPROM 2228 stores modifiable data, and can store the data when no power is supplied to the smart card 222 differing from the RAM 2226, and hence, can store various programs, application programs, passwords, and the normal PIN and the emergency PIN according to the second exemplary embodiment of the present invention. For this purpose, the EEPROM 2228 includes a normal PIN storage unit 22282 and an emergency PIN storage unit 22284.

Figure 8:
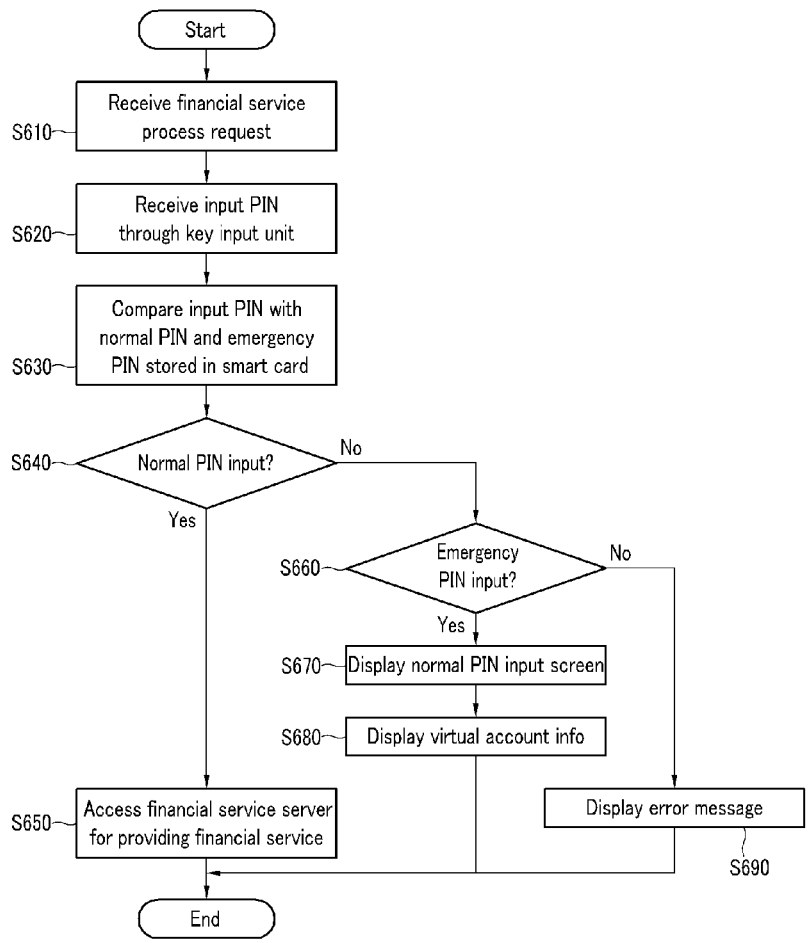
FIG. 8 shows a flowchart for a security service providing method through a mobile terminal password according to a second exemplary embodiment of the present invention.

FIG. 8 shows a flowchart for a security service providing method through a mobile terminal password according to a second exemplary embodiment of the present invention.

Referring to FIG. 8, the user who desires to receive a financial service sets a PIN number to be used for the financial service. According to the second exemplary embodiment of the present invention, the user sets a normal PIN for a normal financial transaction and an emergency PIN for generating virtual account information in the emergency state. In this instance, the normal PIN and the emergency PIN are stored in the EEPROM 2228 of the smart card 222.

Also, the user can set virtual account information that will be provided when the emergency PIN is input. In this instance, the virtual account information is stored in the program memory 202 or the data storage unit 204 of the mobile terminal 200.

When the setting for the financial service is finished through the above-noted process, the user can receive a financial service such as contents use, shopping, or banking by using the mobile terminal 200.

When the user selects a menu for the financial service from among the various program menus installed in the mobile terminal 200 (S610), a program for providing the financial service is called from the program memory 202. When it reaches the security checking stage while performing the financial service providing program, an input PIN is input by the user through the key input unit 206 (S620).

When the input PIN is checked through the input PIN checking module 2142, the normal PIN and the emergency PIN stored in the EEPROM 2228 of the smart card 222 are called by using the smart card information calling module 2140. It is checked through the authentication process module 2144 whether the input PIN is a normal PIN for a normal financial service or an emergency PIN for generating virtual account information (S630).

The authentication process module 2144 compares the input PIN and the normal PIN (S640). When the input PIN is a normal PIN, the mobile terminal 200 is connected to the authentication management server and the financial service server through the mobile communication network so that the user may receive the financial service requested by him (S650).

When the input PIN is not a normal PIN, the authentication process module 2144 checks whether the input PIN is an emergency PIN (S660).

When the input PIN is an emergency PIN, the virtual information generating/calling module 2146 generates or calls the same screen as that of the normal PIN process and provides the screen through the display 208 for the user's security. In this instance, the normal PIN input screen can be stored in advance in the program memory 202 or the data storage unit 204 (S670).

The virtual information generating/calling module 2146 generates virtual account information by calling the virtual account generation program from the program memory 202, or calls the virtual account information that is set in advance and is stored in the program memory 202 or the data storage unit 204, and then displays the called virtual account information through the display 208

However, when the input PIN is not an emergency PIN according to the determination result of step S660, that is, when the input PIN number is neither the normal PIN nor the emergency PIN, it is determined as an input error of a PIN number and an error message for indicating a wrongly input PIN number is displayed. In this instance, it is possible to display the screen for the PIN input again and to perform the process after step S620, or to stop the financial service process (S690).

Figure 9:
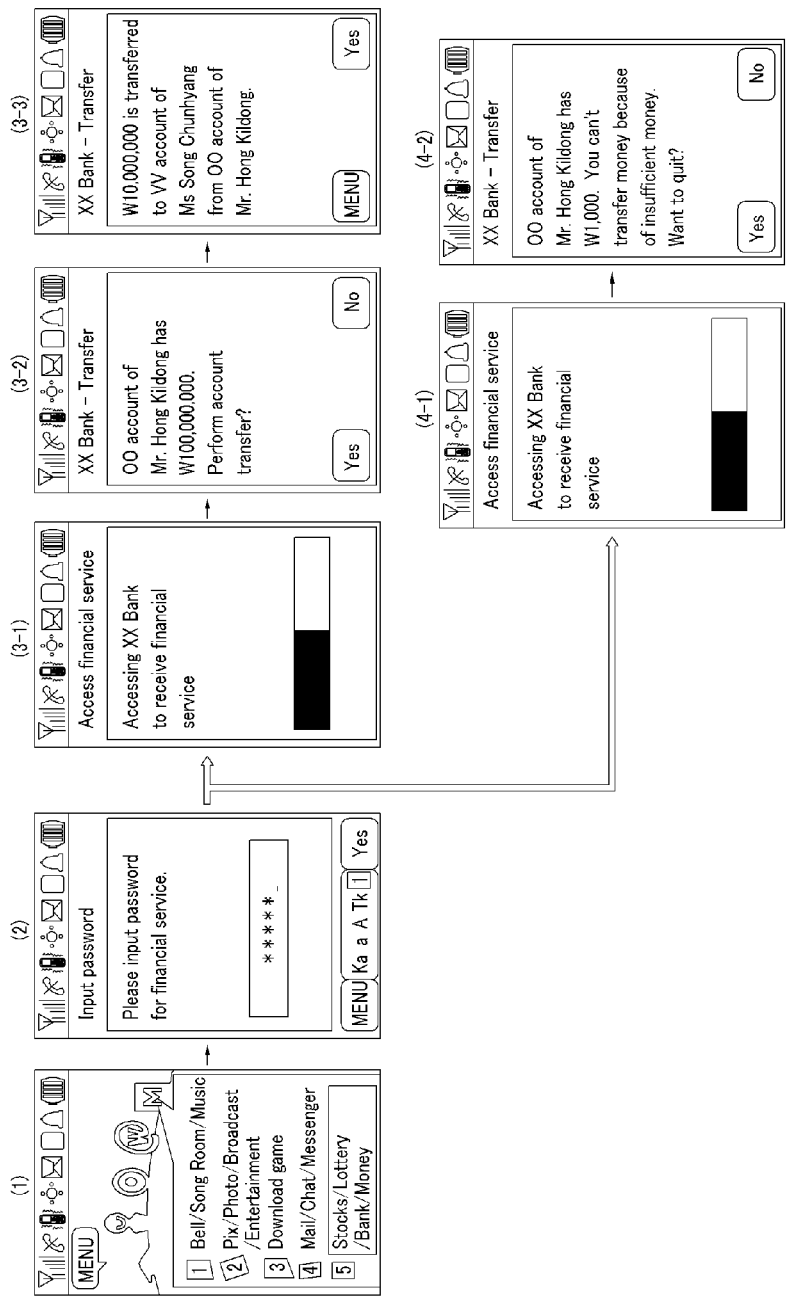
FIG. 9 shows a mobile terminal for receiving a financial service according to a second exemplary embodiment of the present invention.

FIG. 9 shows a mobile terminal for receiving a financial service according to a second exemplary embodiment of the present invention.

Referring to FIG. 9, the user selects a financial service menu from among the various program menus installed in the mobile terminal 200 displayed as shown by (1). When the financial service menu is selected, a PIN number input screen for the financial service is displayed as shown by (2).

In this instance, when the normal PIN is input, the screen of (3-1) for notifying access to the financial service server is displayed, and when the user accesses the financial service server, account information is called and displayed as shown by the screen of (3-2). When a financial service request such as an account transfer is provided by the user through the key input unit 206, the request history is processed through the financial service server, and a financial service result is received as shown by the screen of (3-3).

However, when an emergency PIN is input, the same virtual screen as that of the normal transaction is displayed as the screen of (4-1) for the user's safety. Predetermined virtual account information is called and displayed as the screen of (4-2) for the protection of the user's account.

It has been described in the second exemplary embodiment of the present invention that virtual account information is displayed so as to protect the user's account when an emergency occurs to the mobile terminal user, but without being restricted to this, it is possible to display the virtual account information and simultaneously report the emergency to the emergency telephone number of the police or the security service provider or to transmit an emergency deliverance request message in a like manner of the first exemplary embodiment of the present invention, which will be easily understood by a person of an ordinary skill in the art with reference to FIG. 1 to FIG. 4 and the corresponding detailed description.

In detail, when the emergency PIN input state is checked according to the step of S660 in FIG. 8 and the input of the emergency PIN number is determined, it is possible to determine the user to be dangerous, set virtual account information to be displayed, and simultaneously transmit an emergency message including an emergency message or location information to the emergency telephone number of the police or the security service provider. In this instance, when the emergency networking is performed to the police or the security service provider for the user's safety, the mobile terminal 200 must display no signal on the screen or in a voice.

The financial service has been described in the second exemplary embodiment of the present invention, but without being restricted to this, the above-described configuration and operation is applicable to a special service that is processed by using a password, for example, a communication function and a general mobile terminal function in addition to the financial service, which will be obvious to a person of an ordinary skill in the art. In this case, when a usage request on the special service is provided by the user who is in the emergency condition, the request is sensed through the input emergency PIN to display a virtual process screen having the same format of the case in which the special service is normally processed to the mobile terminal, thereby protecting the user's safety.

As described above, it has been described in the second exemplary embodiment of the present invention that virtual account information is displayed to the mobile terminal user to protect the user's account when an emergency occurs to the user, and a third exemplary embodiment of the present invention for displaying an abnormal process message for notifying no permission of a financial service to the mobile terminal and preventing the normal financial transaction will now be described.

Figure 10:
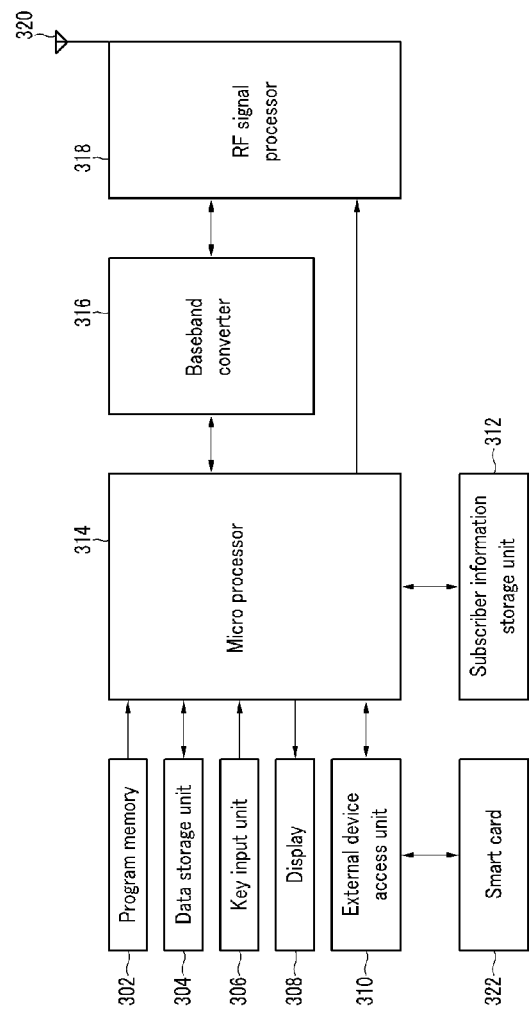
FIG. 10 shows a block diagram of a device for providing a security service through a mobile terminal password according to a third exemplary embodiment of the present invention.

FIG. 10 shows a block diagram of a device for providing a security service through a mobile terminal password according to a third exemplary embodiment of the present invention.

As shown in FIG. 10, the mobile terminal 300 according to the third exemplary embodiment of the present invention includes a program memory 302, a data storage unit 304, a key input unit 306, a display 308, an external device access unit 310, a smart card 322, a subscriber information storage unit 312, a micro processor 314, a baseband converter 316, an RF signal processor 318, and an antenna 320.

In this instance, the functions of the data storage unit 304, the key input unit 306, the display 308, the external device access unit 310, the subscriber information storage unit 312, the baseband converter 316, the RF signal processor 318, and the smart card 322 correspond to those of the data storage unit 204, the key input unit 206, the display 208, the external device access unit 210, the subscriber information storage unit 212, the baseband converter 216, the RF signal processor 218, and the smart card 222 of FIG. 5 according to the second exemplary embodiment of the present invention, and hence, no corresponding detailed description will be provided.

The program memory 302 stores a control program for controlling the mobile terminal 300, and particularly, it stores an input PIN checking program for calling a normal PIN and an emergency PIN stored in the smart card 322 connected through the external device access unit 310 and comparing the PINs with a PIN number that is input through the key input unit 306, an authentication management server connecting program for interworking with the authentication management server through a mobile communication network so as to receive a financial service when the input PIN number corresponds to the normal PIN, and an abnormal process message generating program for generating and displaying an abnormal process message for indicating the impossibility of the financial service when the input PIN number corresponds to the emergency PIN.

The micro processor 314 performs voice and data calling through the mobile communication network, receives the PIN number to check whether it is a normal PIN or an emergency PIN when receiving a financial service providing request through the key input unit 306, accesses the financial service server through the mobile communication network and the authentication management server by using the RF signal processor 318 and receives a financial service when it is a normal PIN, and generates an abnormal process message to the display 308 when it is an emergency PIN, thereby performing an entire control operation. The detailed configuration of the micro processor 314 will now be described with reference to FIG. 11.

Figure 11:
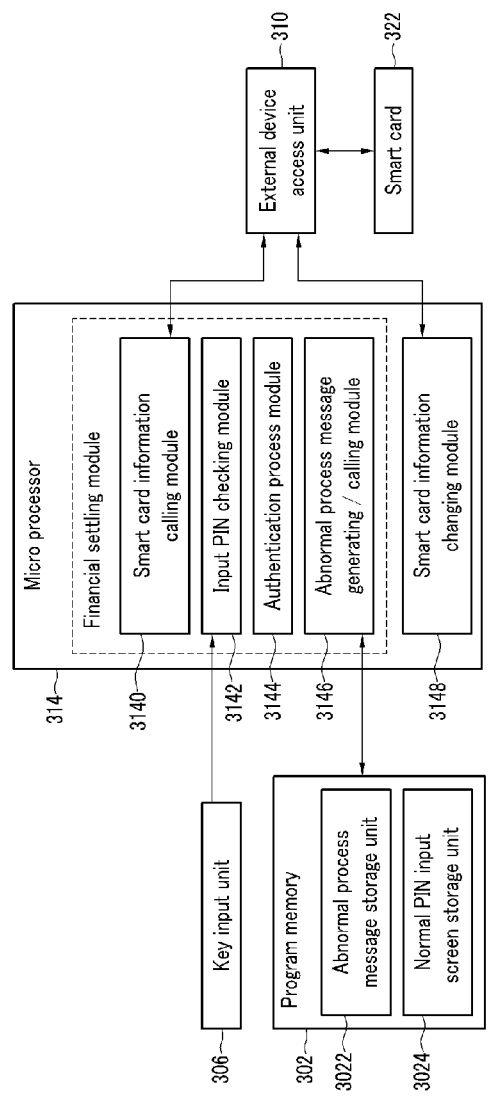
FIG. 11 shows a block diagram for a micro processor of FIG. 10.

FIG. 11 shows a block diagram for a micro processor of FIG. 10.

As shown in FIG. 11, the micro processor 314 includes a smart card information calling module 3140, an input PIN checking module 3142, an authentication process module 3144, an abnormal process message generating/calling module 3146, and a smart card information changing module 3148.

In this instance, the functions of the smart card information calling module 3140, the input PIN checking module 3142, the authentication process module 3146, and the smart card information changing module 3148 correspond to those of the smart card information calling module 2140, the input PIN checking module 2142, the authentication process module 2144, and the smart card information changing module 2148 of FIG. 6 according to the second exemplary embodiment of the present invention, and hence, no corresponding detailed description will be provided.

The abnormal process message generating/calling module 3146 generates an abnormal process message to be provided when the input PIN is determined to be an emergency PIN by the authentication process module 3144, or calls a predetermined abnormal process message.

In this instance, when the abnormal process message to be provided according to the emergency PIN input is stored in the program memory 302 or the data storage unit 304, the abnormal process message generating/calling module 3146 calls the predetermined abnormal process message to display the same to the display 308, and when the abnormal process message is set to be generated by the micro processor 314, the abnormal process message generating/calling module 3146 calls the abnormal process message generating program from the program memory 302 to generate an abnormal process message and display the same to the display 308.

The program memory 302 includes an abnormal process message storage unit 3022 and a normal PIN input checking storage unit 3024 so as to store an abnormal process message in advance. The abnormal process message storage unit 3022 and the normal PIN input screen storage unit 3024 can be included in the data storage unit 304 rather than the program memory 302.

The abnormal process message storage unit 3022 stores the abnormal process message to be provided to the abnormal process message generating/calling module 3146 according to the input of the emergency PIN.

The configuration and functions of the smart card 322 according to the third exemplary embodiment of the present invention correspond to those of the smart card 222 of FIG. 7 according to the second exemplary embodiment of the present invention, and hence, the functions according to the third exemplary embodiment of the present invention will be described by using the configuration shown in FIG. 7.

Figure 12:
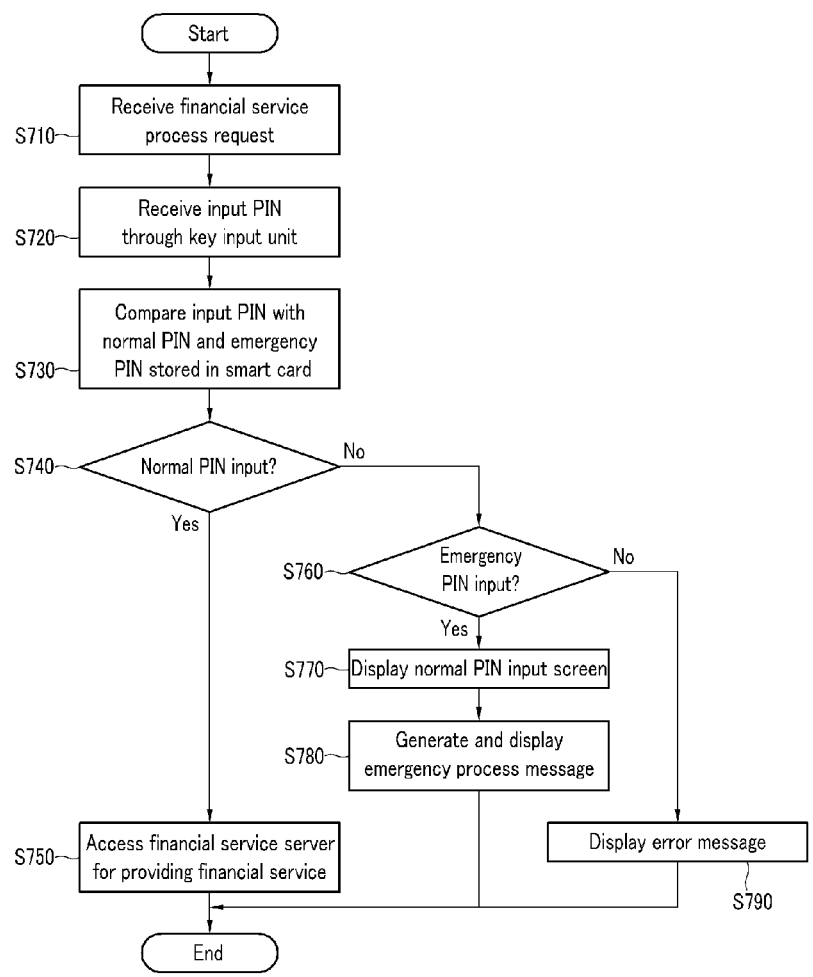
FIG. 12 shows a flowchart for a security service providing method through a mobile terminal password according to a third exemplary embodiment of the present invention.

FIG. 12 shows a flowchart for a security service providing method through a mobile terminal password according to the third exemplary embodiment of the present invention.

Referring to FIG. 12, the user who desires to receive a financial service sets the PIN number to be used for the financial service. The user sets a normal PIN for a normal financial transaction and an emergency PIN to be used for protecting the user's account in an emergency condition. In this instance, the normal PIN and the emergency PIN are stored in the smart card 322.

Also, the user can set the abnormal process message that will be provided when an emergency PIN is input. In this instance, the abnormal process message is stored in the program memory 302 or the data storage unit 304 of the mobile terminal 300.

When the setting for the financial service is finished through the above-described process, the user uses the mobile terminal 300 to receive financial services including contents usage, shopping, and banking.

When the user selects a financial service menu from among the various program menus installed in the mobile terminal 300 (S710), a program for providing the financial service is called from the program memory 302. When it reaches the security checking stage while the financial service providing program is performed, an input PIN is input by the user through the key input unit 306 (S720).

When the input PIN is checked through the input PIN checking module 3162, the normal PIN and the emergency PIN stored in the smart card 322 is called by using the smart card information calling module 3160. The input PIN is checked through the authentication process module 3164 whether it is a normal PIN for a normal financial service or an emergency PIN for protecting the user's account (S730).

The authentication process module 3164 compares the input PIN and the normal PIN (S740). When the input PIN is the normal PIN, the mobile terminal 300 is connected to the authentication management server and the financial service server through the mobile communication network so that the user may receive the requested financial service (S750).

However, when the input PIN is not the normal PIN according to the determination result of step S740, the authentication process module 3164 checks whether the input PIN is an emergency PIN (S760).

When the input PIN is the emergency PIN, the abnormal process message generating/calling module 3166 generates or calls the same screen as that of the normal PIN process and provides the screen to the display 308 for the purpose of the user's safety. In this instance, the normal PIN input screen can be stored in advance in the program memory 302 or the data storage unit 304 (S770).

The abnormal process message generating/calling module 3166 calls the abnormal process message generating program from the program memory 302 to generate an abnormal process message, or calls the abnormal process message that is set in advance and is then stored in the program memory 302 or the data storage unit 304, and displays the called abnormal process message to the display 308 (S780).

However, when the input PIN is not the emergency PIN according to the determination result of step S760, that is, when the input PIN number is not the normal PIN or the emergency PIN, it is determined to be an input error of the PIN number, and an error message indicating the wrongly input PIN number is displayed. In this instance, the process after step S720 can be performed by displaying the PIN input screen, or the financial service process can be stopped (S790).

Figure 13:
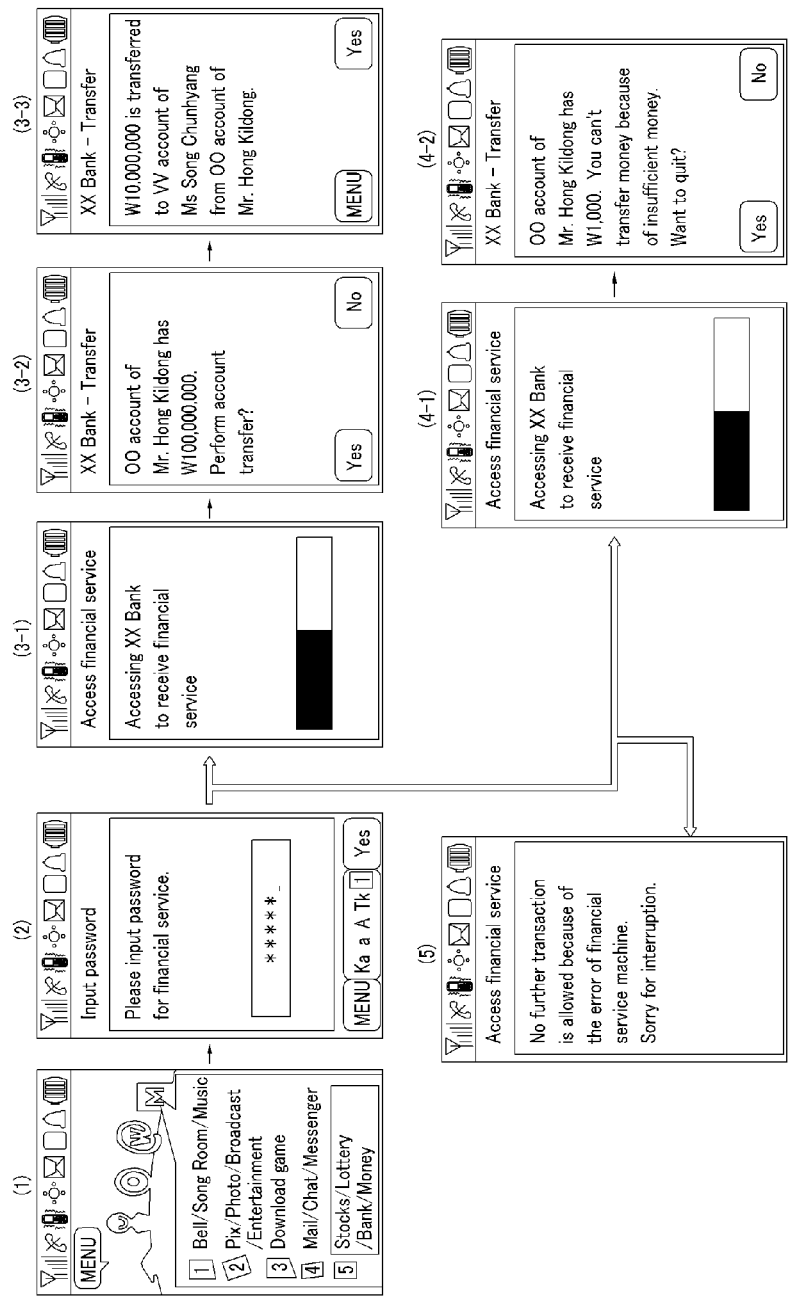
FIG. 13 shows a mobile terminal for receiving a financial service according to a third exemplary embodiment of the present invention.

FIG. 13 shows a mobile terminal for receiving a financial service according to the third exemplary embodiment of the present invention.

Referring to FIG. 13, the user selects the financial service menu from among the various program menus installed in the mobile terminal 300 displayed as in (1). When the financial service is selected, the PIN number input screen for the financial service is displayed as shown by (2).

In this instance, when the normal PIN is input, the screen of (3-1) for indicating access to the financial service server is displayed, and when the user accesses the financial service server, account information is called and displayed as shown by (3-2). When a financial service request such as an account transfer is provided by the user through the key input unit 306, a request history is processed through the financial service server, and a financial service result is received to be provided as the screen of (3-3).

However, when the emergency PIN is input, the same screen as that of the normal transaction is displayed as the screen of (4-1) for the user's safety, and an abnormal process message for protecting the user's account is generated or called and is then displayed as the screen of (4-2).

In this instance, the abnormal process message for indicating generation of a problem to the user's account can be displayed as the screens of (4-1) and (4-2), and an abnormal process message for indicating generation of a problem to the machine can be displayed as the screen of (5).

It has been described in the third exemplary embodiment of the present invention that an abnormal process message for indicating impossibility of a financial service is displayed so as to protect the user's account when an emergency occurs to the mobile terminal user, and in addition, without being restricted to this, it is possible to display the abnormal process message and to simultaneously report the emergency to the police or the security service provider through an emergency telephone number thereof or to transmit an emergency deliverance request message in a like manner of the first exemplary embodiment of the present invention, which will be easily understood by a person of an ordinary skill in the art with reference to FIG. 1 to FIG. 4 and the corresponding detailed descriptions.

In detail, when an input of an emergency PIN number is determined in the case of checking the emergency PIN input state according to step S760 of FIG. 12, the user is determined to be in danger, an abnormal process message is displayed and simultaneously an emergency message including an emergency message or location information can be set to be transmitted to the police or the security service provider through the emergency telephone number thereof. In this instance, the mobile terminal 300 must display no image or sound when performing emergency networking to the police or the security service provider for the user's safety.

The third exemplary embodiment of the present invention has described the financial service, but without being restricted to this, the above-described configuration and operation is applicable to the special service that is processed by using a password, for example, the communication function and the general mobile terminal functions as well as the financial service, which is obvious to a person of an ordinary skill in the art. In this instance, when a usage request on the special service is provided by a user in the emergency condition, the user's condition is sensed by using the input emergency PIN, and an abnormal process message for preventing the process on the requested special service is displayed to the mobile terminal, thereby guaranteeing the user's safety who is in the emergency state.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for providing a security service by a mobile terminal having a special service function that is processed by using a password, the method comprising:
   a) receiving a password for activating the special service function;
   b) reading a normal password and an emergency password that are stored in a memory;
   c) comparing the password that was received with the normal password and the emergency password that are set and stored in a memory; and
   d) activating the special service function when the password corresponds to the normal password, and performing a predetermined emergency networking process and activating the special service function when the password corresponds to the emergency password,
   wherein the predetermined emergency networking process is performed in a background mode in the mobile terminal, and a progress process and progress results of the predetermined emergency networking process are not displayed on the mobile terminal, and
   wherein, when the received password corresponds to the emergency password, the method further includes reading predetermined virtual information relating to the activated special service function that is stored in the memory and displaying, on a display of the mobile terminal, the predetermined virtual information relating to the activated special service function, wherein the emergency networking process in d) includes:
  i) searching for at least one telephone number that is predetermined in the memory of the mobile terminal;
  ii) extracting contents stored in the memory of the mobile terminal; and
  iii) transmitting the extracted contents to the searched at least one telephone number by using a short message service (SMS).

2. The method of claim 1, wherein the step of iii) includes including current location information of the mobile terminal into the extracted contents and transmitting the contents.

3. The method of claim 1, wherein the stored contents is an emergency indicating message or an emergency deliverance request message.

4. The method of claim 1, wherein the special service function is a financial transaction function or a communication function.

5. The method of claim 1, wherein the step of d) includes outputting an error message and restricting usage of the special service function when the password does not correspond to the normal password or the emergency password.

6. The method of claim 1, wherein the memory in c) for storing the normal password and the emergency password is included in a universal IC card (UICC) or a universal subscriber identity module (USIM).

7. The method of claim 1, wherein the password is a personal identification number (PIN) used for the UICC or the USIM.

8. A mobile terminal having a special service function that is processed by using a password, the mobile terminal comprising:
  a password input module configured to receive a password from a user;
  a storage module configured to store a normal password and an emergency password, predetermined virtual information relating to the activated special service function, and at least one emergency telephone number and one short message service (SMS) emergency message;
  an authentication module configured to:
    read the normal password and the emergency password from the storage module,
    compare the received password with the normal password and the emergency password,
    provide an authentication success signal when the password provided by the password input module corresponds to the normal password, and
    instruct an emergency process together with the authentication success signal when the password corresponds to the emergency password;
  a message transmission module configured to transmit the SMS emergency message stored in the storage module to at least one emergency telephone number stored in the storage module when an emergency process is instructed by the authentication module; and
  a function activation module configured to receive an authentication success signal from the authentication module and activate the special service function,
  wherein the emergency process is performed in a background mode in the mobile terminal, and a progress process and progress results of the emergency process are not displayed on the mobile terminal, and
  wherein, when the password provided by the password input module corresponds to the emergency password, the predetermined virtual information relating to the activated special service function is read from the storage module and displayed on the mobile terminal.

9. The mobile terminal of claim 8, wherein the authentication module is configured to provide an authentication failure signal when the password received from the password input module does not correspond to the normal password or the emergency password stored in the storage module, the mobile terminal further includes an error process module configured to display an error message to the mobile terminal according to the authentication failure signal provided by the authentication module, and the function activation module is configured to restrict the special service function when receiving an authentication failure signal from the authentication module.

10. The mobile terminal of claim 8, wherein the storage module is installed in a UICC or a USIM.

* * * * *